United States Patent [19]

Fujimori et al.

[11] 4,348,659

[45] Sep. 7, 1982

[54] METHOD AND APPARATUS FOR ENCODING A DIGITAL SIGNAL TO HAVE MINIMAL DC COMPONENT

[75] Inventors: Yasuhiro Fujimori, Tokyo; Kaichi Yamamoto, Zama, both of Japan

[73] Assignee: Sony Corporation, Tokyo, Japan

[21] Appl. No.: 199,598

[22] Filed: Oct. 22, 1980

[30] Foreign Application Priority Data

Oct. 29, 1979 [JP] Japan ................. 54-139662

[51] Int. Cl.³ ................... H03K 13/00; H03K 13/24
[52] U.S. Cl. ................... 340/347 AD; 340/347 DD; 360/32
[58] Field of Search ........... 340/347 DD, 347 AD; 360/32, 40, 39; 371/55, 56; 375/19

[56] References Cited

U.S. PATENT DOCUMENTS 3,678,389 7/1972 Heers .................. 340/347 DD
3,921,210 11/1975 Halpern ............... 340/347 DD
4,277,807 7/1981 Baldwin .................. 360/32

*Primary Examiner*—Charles D. Miller

*Attorney, Agent, or Firm*—Alvin Sinderbrand; Lewis H. Eslinger

[57] ABSTRACT

An analog signal is quantized over a range of quantizing levels, each level being associated with a digital signal, and wherein the digital signals which are associated with a predetermined band of the quantizing levels have zero disparity. In accordance with one aspect, those digital signals which are outside the aforementioned band and which have non-zero disparity are selected to represent corresponding quantizing levels in such a manner that positive and negative disparity signals are selected, alternately, to represent quantized analog signals which are disposed outside the predetermined band. In accordance with another aspect, those zero disparity digital signals having the smallest run-lengths are assigned to represent quantizing levels which are disposed substantially in the center of the quantizing range, and those zero disparity digital signals having progressively larger run-lengths are assigned to represent quantizing levels which are disposed progressively farther from the center of the range.

29 Claims, 8 Drawing Figures

FIG.3
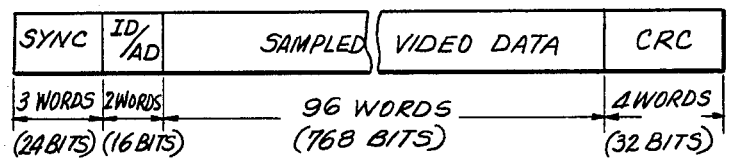
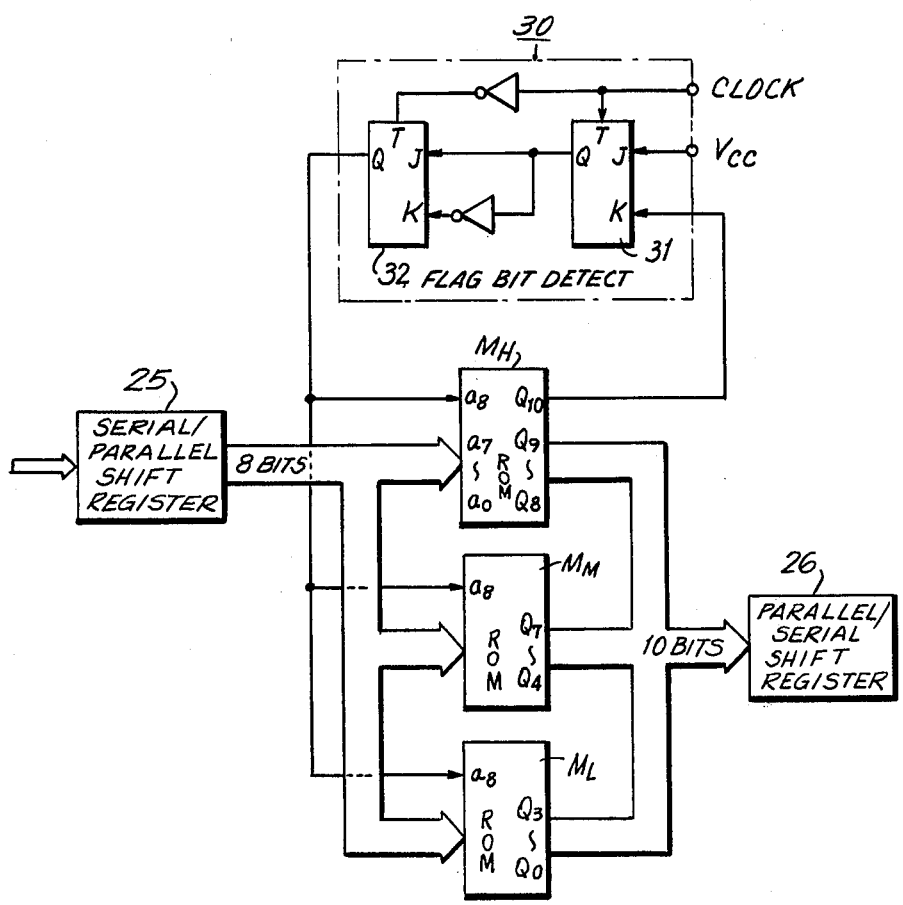
FIG.4

FIG.7
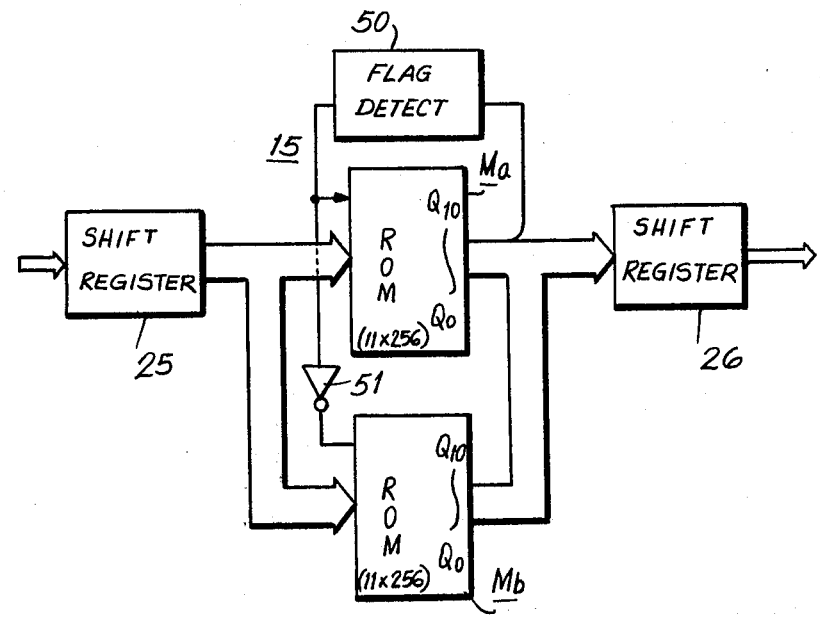
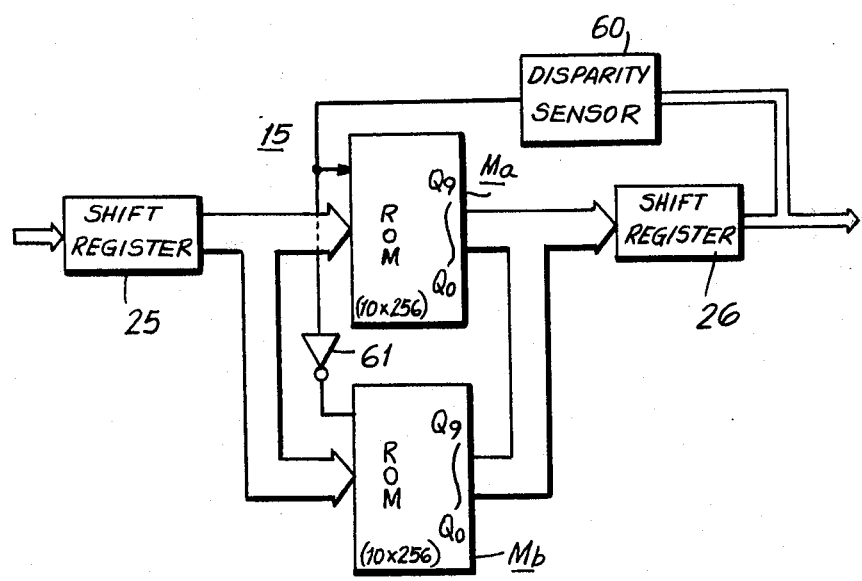
FIG.8

METHOD AND APPARATUS FOR ENCODING A DIGITAL SIGNAL TO HAVE MINIMAL DC COMPONENT

BACKGROUND OF THE INVENTION

This invention relates to a technique for encoding digital signals to have minimal DC component and, more particularly, to a so-called "block-coding" technique wherein an m-bit code signal is used to represent a n-bit digital word, with the m-bit code signal exhibiting zero disparity for most of the n-bit digital words represented thereby, and also exhibiting minimal runlength for those digital words having a greater probability of occurrence.

When digital information is transmitted or recorded on, for example, a magnetic medium, the DC levels, or components, which represent each binary "1" and "0" of the digital signals often is so distorted that the original digital signal cannot be reproduced with any degree of accuracy. For example, in magnetic recording of digital information, such DC components are blocked by the usual recording amplifiers and recording heads, as well as the playback amplifiers and playback heads. For the application of digital recording techniques in the field of video information, such as in a digital video tape recorder (VTR), such DC components are additionally blocked by the particular circuitry and electrical elements which comprise the digital VTR. Since distortion of the digital signals which ultimately are reproduced from the magnetic medium results in serious degradation of the television picture which is produced therefrom, it is desirable to use signal modulation techniques so as to record a suitably modulated signal that exhibits good noise immunity and, moreover, has a substantially zero DC component. It is throught that if the DC component of the digital signal, that is, the overall or average DC value for all of the bits constituting that signal is equal to zero, then the fact that the DC component is blocked because of the inherent characteristics of the recording and reproducing apparatus will not distort the digital signal which can be recovered. One example of an encoding technique which has been proposed to minimize this DC component of the digital signal is described in copending U.S. application Ser. No. 192,358, filed Sept. 30, 1980.

The encoding of an n-bit digital bit signal to an m-bit code word is referred to generally herein as "block encoding". If a binary "1" is represented by a DC level of, for example, +1, and if a binary "0" is represented by a level of −1, then a binary "1" followed by a binary "0" [10] will exhibit a zero DC component. A combination of bits, such as [100] exhibits a DC component of −1. A combination of bits [1001] exhibits a DC component of zero. Thus, a plural-bit word may be thought of as having a DC component that is equal to the difference between the number of binary "1"s and "0"s contained in that word. This DC component is referred to herein as the "disparity" of that word. If the disparity of a digital word is positive, then the number of binary "1"s exceeds the number of binary "0"s in that word. Conversely, if the disparity of a digital word is negative, then the number of binary "1"s is less than the number of binary "0"s. For a digital word formed of an even number of bits, the disparity thereof is zero if the number of binary "1"s is equal to the number of binary "0"s. Of course, an even-numbered bit word may exhibit positive or negative disparity, depending upon whether the number of binary "1"s exceeds or is less than the number of binary "0"s.

It is thought that, if every n-bit digital word can be converted to an m-bit code word wherein each such m-bit code word exhibits zero disparity, then the overall DC component of those code words which are recorded will be equal to zero. Hence, distortion and degradation in the reproduced digital signal can be minimized. It is seen that, if n=4, then a total of sixteen different digital words can be constructed of these four bits. Now, if m=6, then a total of twenty 6-bit zero disparity code words are available. Accordingly, each 4-bit word can be represented by a single, corresponding 6-bit zero disparity code word. However, in many applications, such as in digital video recording, the original digital signal is formed of eight bits. With particular reference to a digital VTR, each video signal level is sampled and quantized into one of 256 different quantizing levels. Each quantizing level thus is represented by a respective one of 256 different 8-bit signals. If each 8-bit signal is to be represented by one 10-bit code word, then, of the 1,024 different 10-bit code words which are available, only 252 exhibit zero disparity. Consequently, if each 8-bit digital signal is to be represented by a zero disparity code word, then each code word must be formed of twelve bits. But, since only eight bits are needed to represent useful information, it is seen that, in this block encoding scheme, four redundant bits must be used. This adds to the bit density of the signals which must be recorded, and is undesirable.

It is one advantageous feature of the present invention to minimize the number of redundant bits which are used in the m-bit code word, even though this provides a smaller number of zero disparity code bits than there are n-bit digital signals. To represent the "surplus" n-bit digital signals, m-bit code words having non-zero disparity are used, but such code words are assigned to represent n-bit digital signals having a relatively low probability of occurrence. Also, in the event that one of these surplus n-bit digital signal occurs, it will be represented by a non-zero disparity m-bit code word of one polarity (either positive—representing a greater number of binary "1"s than "0"s, or negative—representing a greater number of binary "0"s than "1"s), and when another surplus n-bit digital signal occurs, it will be represented by a non-zero disparity m-bit code word of opposite polarity. Thus, the overall DC component nevertheless will be minimized.

If it is possible to generate code words having only zero disparity, it is appreciated that some of these code words will exhibit substantial "run lengths". The run length of a digital signal is the number of binary "1"s or "0"s that are repeated in succession. For example, the 10-bit code word [1010101010] exhibits minimal run length; the 10-bit code word [1110000101] exhibits substantially greater run length; and the code word [1111100000] exhibits maximum run length. When a digital signal having a large run length is recorded magnetically, the phenomenon of "peak shift" may occur when that signal is reproduced. Such peak shift results in the reproduction of distorted data.

It is another advantageous feature of the present invention to assign code words having minimal run length to those digital signals having a higher probability of occurring, and to assign those code words having progressively larger run lengths to those digital signals having a progressively smaller probability of occurring. Analogous to this feature, code words having minimal run length may be assigned to those digital signals wherein distortion, due to peak shift or the like, results in greater interference. For example, if this invention is used in a digital VTR, and if the analog video signal is quantized over a range of 256 quantizing levels, then code words having minimal run length and zero disparity are assigned to those quantizing levels which are in substantially the center portion of this quantizing range.

OBJECTS OF THE INVENTION

Therefore, it is an object of the present invention to provide an improved block encoding technique for digital signals.

Another object of this invention is to provide a technique for encoding a digital signal to exhibit a minimal overall DC component.

A further object of this invention is to provide a technique for converting an analog signal to a plural-bit digital signal having minimal DC component.

An additional object of this invention is to provide an improved block encoding technique by which an input analog video signal is encoded for optimum recording by a digital video recorder.

Various other objects, advantages and features of the present invention will become readily apparent from the ensuing detailed description, and the novel features will be particularly pointed out in the appended claims.

SUMMARY OF THE INVENTION

In accordance with this invention, an analog signal is converted to a plural-bit digital signal having minimal DC component. The analog signal is quantized over a range of quantizing levels, and each quantizing level is associated with a respective digital signal. In accordance with one aspect, digital signals having zero disparity and exhibiting the smallest run lengths are assigned to those quantizing levels which are disposed substantially in the center of a predetermined band within the quantizing range, and those zero disparity digital signals having progressively larger run lengths are assigned to those quantizing levels which are disposed progressively farther from the center of the band. In accordance with another aspect of this invention, the number of quantizing levels in the range exceeds the number of zero disparity digital signals. Accordingly, non-zero disparity digital signals are assigned to those quantizing levels which are outside the aforementioned predetermined band. Furthermore, each of these quantizing levels outside the predetermined band is assigned to a positive non-zero disparity digital signal and also to a negative non-zero disparity digital signal. When a non-zero disparity signal of one polarity is selected to represent one of these quantizing levels, the next one of these quantizing levels is represented by a non-zero disparity digital signal of opposite polarity.

BRIEF DESCRIPTION OF THE DRAWINGS

The following detailed description, given by way of example, will best be understood in conjunction with the accompanying drawings in which:

FIG. 3 is a diagrammatic representation of the code arrangement which is used to record the video signals by the digital video recorder/reproducer of FIG. 1;

FIG. 4 is a partial block, partial logic diagram of one embodiment of the present invention;

FIGS. 7 and 8 are block diagrams of other embodiments of the present invention.

DETAILED DESCRIPTION OF CERTAIN PREFERRED EMBODIMENTS

Figure 1:
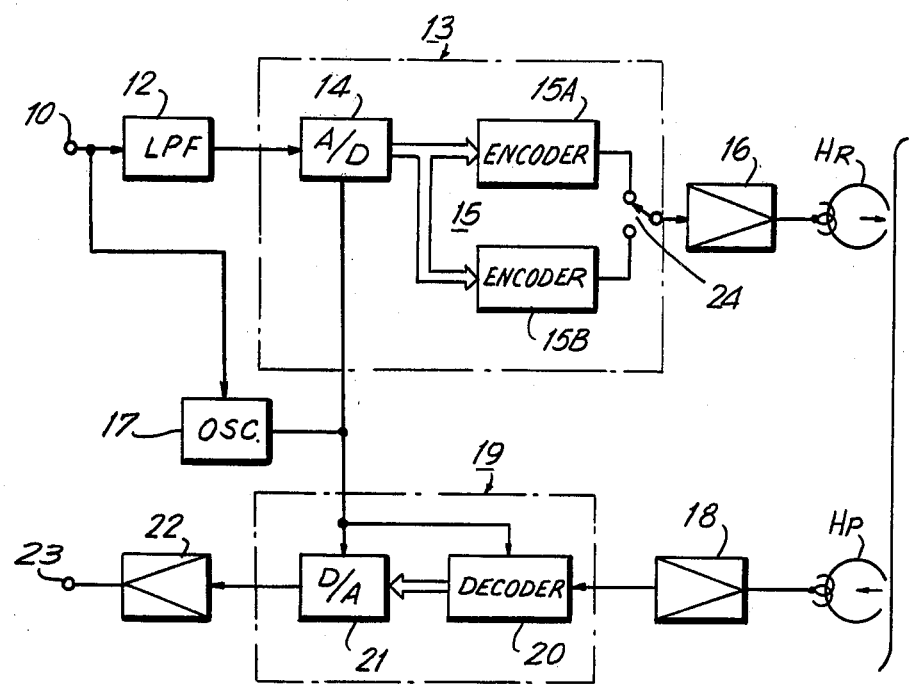
FIG. 1 is a block diagram of a digital video recorder/reproducer with which the present invention can be used.

Turning now to the drawings, wherein like reference numerals are used throughout, reference first is made to FIG. 1 which is a block diagram of a digital VTR with which the present invention can be used. Although this invention is shown in the environment of a digital VTR, it should be readily appreciated that other applications are contemplated. Thus, the encoder of this invention can be used to produce m-bit code words representing n-bit input data words or to represent sample analog levels for recording or transmitting digital information.

More particularly, the digital VTR shown in FIG. 1 includes an input terminal 10 to which a composite color video signal is supplied. This video signal is an analog signal and is filtered by low pass filter 12 to remove higher frequency noises and interference therefrom. The filtered video signal then is supplied to a converting circuit 13 whereat the analog video signal is converted to m-bit digital signals suitable for recording on a magnetic medium, such as magnetic tape Mg. The input video signal also is supplied from input terminal 10 to a synchronized oscillator 17 which functions to generate clock signals that are used for sampling the analog signal and for generating various timing and control signals for operating converting circuit 13.

Data converting circuit 13 is comprised of an analog-to-digital (A/D) converter 14 which is supplied with timing signals generated by oscillator 17 for sampling the input analog signal supplied thereto from input terminal 10. As one example thereof, the timing signals which are used for sampling the input analog signal may exhibit a sampling frequency $3f_{sc}$, where $f_{sc}$ is the usual color subcarrier frequency of, for example, an NTSC color video signal. A/D converter 14 converts each sampled analog level to a corresponding 8-bit data word. Thus, and as is appreciated, the A/D converter may be provided with 256 quantizing levels ($2^8$), and each quantizing level is represented by a corresponding 8-bit word. The manner in which such quantizing levels are generated, and the particular circuitry which is used to sample the analog signal and to convert each sample to a corresponding 8-bit word are well known to those of ordinary skill in the art. Hence, in the interest of brevity, further detailed description of A/D converter 14 is not provided.

Data converting circuit 13 also includes a pair of block encoders 15A and 15B, these block encoders being supplied in common with each 8-bit data word generated by A/D converter 14. Preferably, although not necessarily, each 8-bit data word is supplied to these block encoders in parallel-by-bit form. Each block encoder is adapted to convert each 8-bit data word supplied thereto to a 10-bit code word. Most of these 10-bit code words exhibit zero disparity, except for a relatively small number of such 10-bit code words which exhibit non-zero disparity and are produced when the quantized level of the input video signal is at levels which do not recur frequently. Furthermore, each block encoder 15A and 15B produces a zero disparity 10-bit code word having minimal run length when the quantized level of the video signal is within the central portion of the overall quantizing range. For example, if the video signal can be quantized to one of 256 separate quantizing levels, or steps, ranging step 0 to step 255, then the 10-bit code word generated by block encoders 15A and 15B will exhibit minimal run length if the quantized level of the video signal is equal to, for example, steps 132 and 133. If the quantized level of the video signal is progressively higher or lower than this central portion, the run length of the 10-bit code word associated with that quantized level is progressively larger. For example, for quantized step 253 or for quantized step 4, the zero disparity 10-bit code words exhibit maximum run length. As will be described, non-zero disparity 10-bit code words are provided to represent the remaining quantizing levels, such as levels 254 and 255, and such as levels 0, 1, 2 and 3.

A change-over switch 24 is coupled to the outputs of respective block encoders 15A and 15B. The purpose of the change-over switch is to select the non-zero disparity code word from one of these block encoders and then to select the next non-zero disparity code word from the other block encoder. If block encoder 15A produces, for example, positive non-zero disparity code words, and if block encoder 15B produces negative non-zero disparity code words, then, in the event that the quantized level of the input video signal is such that a non-zero disparity code word is produced, change-over switch 24 selects one of these block encoders and then is changed over to select the other so as to produce a non-zero disparity code word of one polarity to represent one of these quantized levels and then to produce a non-zero disparity code word of opposite polarity to represent the next one of these quantized levels. This operation will be described in greater detail below with respect to certain preferred embodiments.

The output of change-over switch 24 is coupled to a recording amplifier 16, wherein each code word is amplified, and the amplified code words then are supplied to a recording head $H_R$ to be recorded on magnetic tape Mg. In a preferred embodiment of the digital VTR, which forms no part of the present invention per se, the recording head is comprised of plural rotary heads which scan skewed tracks across a helically-wrapped magnetic tape. Furthermore, digitized samples of the input video signal, such as the code words generated by block encoders 15A and 15B, are further encoded in an error correcting code and are selectively combined to form sub-blocks, each sub-block including a number of code words representing video information, code words representing, for example, a CRC error detecting code, code words representing particular address and identification signals by which the sub-block can be properly identified, and code words representing a synchronizing code.

The digital VTR shown in FIG. 1 also includes a reproducing section by which the digitized video signals, which are recorded on magnetic tape Mg by recording head $H_R$, are reproduced; and the original video information is recovered. More particularly, this reproducing section includes a playback head $H_p$, which may be similar to recording head $H_R$, to reproduce the recorded, digital video signals, and a playback amplifier 18 to amplify such digital signals. It should be appreciated that, if the digital signals are recorded in the aforementioned sub-block configuration, then such digital signals are reproduced in the same sub-block configuration. After amplification, such reproduced digital signals are supplied to a data converting circuit 19 which, for example, may be complementary to data converting circuit 13 to recover the video information. Data converting circuit 19 includes a block decoder 20 which, for example, may decode each 10-bit data word to its corresponding 8-bit data word. Data converting circuit 19 also may include error correcting decoders, and the like, which detect errors in the respective data words constituting each reproduced sub-block, and which correct or compensate for such erroneous words.

The decoded 8-bit information words produced by decoder 20 in response to the reproduced 10-bit code words are converted to an analog signal by digital-to-analog (D/A) converter 21. D/A converter 21 may be of any conventional construction known to those of ordinary skill in the art. In the interest of brevity, further description of this D/A converter is not provided. The reproduced analog signal then is amplified by an amplifier 22 and supplied to an output terminal 23 for further utilization. For example, a television monitor may be coupled to output terminal 23 so as to display the video picture corresponding to the reproduced video signal.

Figure 2:
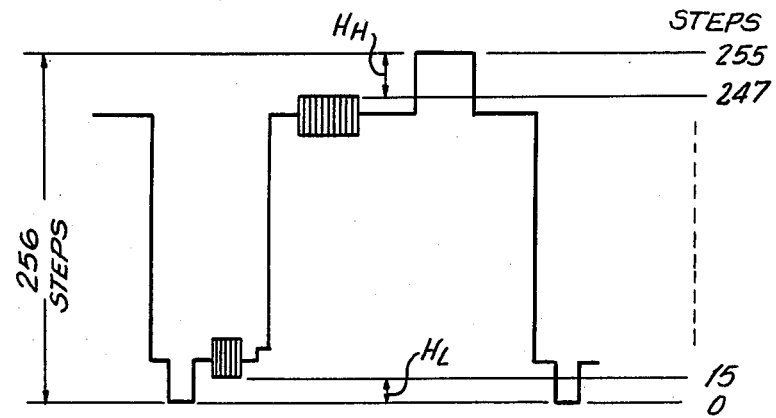
FIG. 2 is a graphic representation of a color video signal juxtaposed with a number of quantizing levels therefor.

FIG. 2 is a graphic representation of a typical, composite color video signal of the NTSC form. This video signal includes horizontal synchronizing pulses, burst pulses, and useful video information. Typically, the video signal can be quantized into 256 steps, each step being represented by an 8-bit information word. As one example, the SYNC tip of the horizontal synchronizing signal may be assigned to quantizing level zero, the negative peak of the burst signal may be assigned to quantizing level 15, and the maximum white level of the video information may be assigned to quantizing level 255. In FIG. 2, there is a very low probability that video information will be present in the low-level region, designated $H_L$, or in the high-level region, designated $H_H$. As will be described below, if a quantized analog level falls within these regions $H_L$ or $H_H$, it is represented as a 10-bit code word having non-zero disparity. More particularly, one of these low-level or high-level quantized signals will be represented by a code word having, for example, positive disparity, and the next-occurring low-level or high-level quantized signal will be represented by a code word having negative disparity. Of course, those quantized levels falling within the band between low-level region $H_L$ and high-level region $H_H$ will be represented by a code word having zero disparity.

In one embodiment of the digital VTR with which the present invention can be used, the digitized samples of each horizontal line interval are distributed into plural channels. For example, the even-numbered and odd-numbered samples may be separated from each other and then the separated samples may be grouped into sub-blocks. Thus, the digitized samples of one line of video information are formed into a plurality of sub-blocks. As one example, six sub-blocks of digitized samples may be used to represent each line of video information, with each sub-block being formed of 96 digitized samples, referred to below as 96 words. These sub-blocks may be recorded in different channels, and the respective sub-blocks in each channel may be recorded serially. One example of such a sub-block configuration for use in a digital VTR is described in co-pending U.S. application Ser. No. 192,358.

Referring to FIG. 3, a typical arrangement of a sub-block of information is depicted. If it is assumed that the sub-block is formed of 8-bit words, then the entire sub-block is constituted by 105 words consisting of a block synchronizing signal SYNC formed of three words, an ID/AD signal, which identifies the channel, line (odd or even), field (odd or even) and frame (odd or even) of the digitized video samples included in the sub-block, as well as the particular location of this sub-block in a field of similar sub-blocks, formed of two words, 96 digitized video signal samples, or words, and a CRC error detecting code formed of four words. These respective words are arranged, one after the other, as depicted in FIG. 3. The SYNC words are used, during a video signal reproducing operation, to detect the beginning of the sub-block and thus enable the ID/AD words, sampled video data words and CRC words to be detected. In the aforementioned copending application U.S. Ser. No. 192,358, one horizontal line period of the video signal is comprised of 288 samples per channel, with each channel being formed of three sub-blocks have 96 digitized samples in each sub-block. Preferably, each sub-block is supplied to block-encoders 15A and 15B such that each 8-bit word therein is converted to a corresponding 10-bit code word.

Turning now to FIG. 4, there is illustrated one embodiment of a block encoding circuit 15 which may be used to constitute block encoders 15A and 15B. The encoder is comprised of three memory devices, such as read-only memories (ROM's) $M_L$, $M_M$ and $M_H$. Each of these ROM's may be, for example, Model DLSPB426D memory circuits having addressable locations which are addressed by a 9-bit address word and which store four bits. For a particular 9-bit address word, ROM $M_L$ reads out four lower order bits of a 10-bit word, ROM $M_M$ reads out four middle order bits of that 10-bit word, and ROM $M_H$ reads out the remaining two higher order bits. Thus, all of the ROM's $M_L$, $M_M$ and $M_H$ are addressed by the very same 9-bit address word, and each ROM reads out a respective set of the lower order, middle order and higher order bits of the corresponding 10-bit code word, which bits are stored in the particular location which is addressed by the 9-bit address word.

Each 9-bit address word is comprised of data bits $a_0$–$a_7$ which, for example, may be constituted by the 8-bit data word, or digitized sample, representing the quantized level of the sampled analog video signal. The ninth bit $a_8$ functions as a memory select bit, as will be described. Of the ten bits which constitute the code word read out from the ROM's in response to the address words supplied thereto, to lower order bits $Q_0$–$Q_3$ are read out from ROM $M_L$, the middle order bits $Q_4$–$Q_7$ are read out from ROM $M_M$, and the higher order bits $Q_8$ and $Q_9$ are read out from ROM $M_H$. In addition, each 10-bit word is accompanied by a flag bit $Q_{10}$ stored in ROM $M_H$. The purpose of this flag bit soon will be described.

In one embodiment of the digital VTR with which the present invention can be used, A/D converter 14 digitizes each sample of the input video signal as a serial-by-bit data word. Accordingly, block encoder 15 includes a shift register 25 which functions as a serial-to-parallel converter to supply bits $a_0$–$a_7$ to the ROMs in parallel form. It is appreciated that shift register 25 may be omitted if A/D converter 14 supplies parallel-by-bit data words.

If ROM's $M_L$, $M_M$ and $M_H$ provide each 10-bit code word as a parallel-by-bit word, a shift register 26 may be provided to function as a parallel-to-serial converter so as to supply each code word in serial-by-bit form. Thus, the individual bits are recorded serially. Shift register 26 may be omitted if the ROM's supply each 10-bit code word serially.

It is appreciated that the respective ROM's $M_L$, $M_M$ and $M_H$ can be replaced by a single read-only memory device which has $2^9$ storage locations, each storage location storing an 11-bit ($Q_0$–$Q_{10}$) word. To facilitate an understanding of the apparatus shown in FIG. 4, it will be assumed that such a single read-only memory device is used. This memory device may be thought of as including two storage areas, each storage area having 256 11-bit code words stored therein. For convenience, these two storage areas are referred to herein as memory maps MA and MB, respectively. Map MA stores the 250 zero disparity code words plus six code words having, for example, positive disparity. The flag bit $Q_{10}$ associated with each zero disparity code word is a binary "0", and the flag bit $Q_{10}$ associated with each non-zero disparity code word is a binary "1". Similarly, map MB stores the very same 250 zero disparity code words and, in addition, stores six code words having negative disparity. The flag bit $Q_{10}$ associated with each code word in map MB is a binary "0" for the zero disparity code words and is a binary "1" for the non-zero disparity code words. As will now be described, each flag bit $Q_{10}$ which is read out of the memory, that is, which is read out of map MA or map MB is detected and is used to select the particular map from which the next code word is read.

The flag bit $Q_{10}$, associated with each 10-bit code word in each of maps MA and MB is detected by a flag bit detector 30. The flag bit detector is comprised of a pair of J-K flip-flop circuits 31 and 32, with the J input of flip-flop circuit 31 being coupled to a source of positive potential $V_{cc}$, which serves to supply a constant binary "1" thereto, and with K input thereof coupled to receive the flag bit $Q_{10}$ read out of the memory. The Q output of flip-flop circuit 31 is coupled to the J input of flip-flop circuit 32, and the inverted version of the Q output is supplied to the K input of flip-flop circuit 32. The Q output of flip-flop circuit 32 is supplied as the memory select bit $a_8$ to the memory. Finally, a clock signal is supplied to the T input of flip-flop circuit 31, and the inverted version of this clock signal is supplied to the T input of flip-flop circuit 32.

In operation, let it be assumed that, when the memory select bit $a_8$ is a binary "0", map MA is selected to read out the 10-bit code word which then is being addressed by the 8-bit address word $a_0$–$a_7$ which is generated by A/D converter 14. Conversely, when memory select bit $a_8$ is a binary "1", map MB is selected to be addressed. Of course, the particular location in the selected map MA or MB which is addressed by the 8-bit data word $a_0$–$a_7$ is supplied as the 10-bit code word, and the flag bit $Q_{10}$ associated with each read-out code word is supplied to flag bit detector 30.

As mentioned above, the flag bit $Q_{10}$ is a binary "1" to identify the non-zero disparity words in each of maps MA and MB. This flag bit is a binary "0" to identify each zero disparity word in the maps. It may be appreciated that, if the clock signal supplied to flag bit detector 30 is synchronized with each read-out operation of the memory, then, if the flag bit $Q_{10}$ is a binary "1", flip-flop circuit 31 is "toggled", or changed over either from its set state to its reset state or from its reset state to its set state, at the first half-cycle of the clock pulse. During the next half-cycle of the clock pulse, if flip-flop circuit 31 had been changed over to its set state, flip-flop circuit 32 likewise is changed over to assume its set state, whereby memory select bit $a_8$ is a binary "1". Conversely, if flip-flop circuit 31 had been changed over to its reset state, flip-flop circuit 32 likewise assumes its reset state, whereby memory select bit $a_8$ is a binary "0". Thus, it is seen that, whenever the flag bit $Q_{10}$ is a binary "1", flip-flop circuits 31 and 32 are toggled so as to change the state of the memory select bit $a_8$. However, when the flag bit $Q_{10}$ is a binary "0", flip-flop circuits 31 and 32 maintain the state which they previously assumed.

Figure 5:
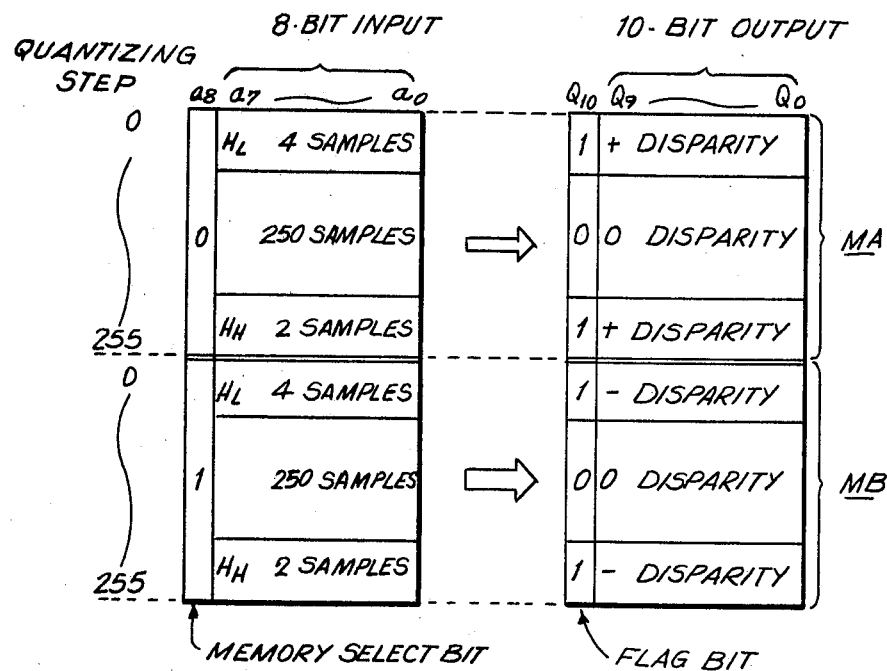
FIG. 5 is a diagrammatic representation which is useful in understanding the operation of this invention.

The manner in which maps MA and MB are selected now will be described with reference to FIG. 5. The upper portion of FIG. 5 is associated with map MA, and the lower portion is associated with map MB. The left-hand portion associated with map MA represents the address words which are generated in response to each quantized level of the input video signal ($a_0$–$a_7$), including memory select bit $a_8$. The right-hand portion associated with map MA represents the code words ($Q_0$–$Q_9$) which are read out of map MA in response to each address word supplied thereto, these code words having positive or zero disparity, depending upon the particular address word which is received. Also, it is seen that flag bit $Q_{10}$ associated with the zero disparity code words is a binary "0", and the flag bit associated with the positive disparity code words is a binary "1". Similarly, the left-hand portion associated with map MB represents the address words generated in response to the quantized levels of the input video signal, including memory select bit $a_8$. The right-hand portion associated with map MB represents the code words which are read out of the memory, together with the flag bit $Q_{10}$.

It is appreciated that, of the 256 8-bit address words which are derived from A/D converter 14, 250 of these words are used to address zero disparity code words. These 250 samples may be produced when, for example, the quantized level of the input video signal lies between quantizing step 4 and quantizing step 253. If the input video signal lies in the lower region $H_L$, that is, if the quantized level of the input video signal corresponds to any of quantizing steps 0 to 3, the corresponding code word which is read out of the memory exhibits non-zero disparity. If this code word is read out of map MA, it exhibits positive disparity, and if it is read out of map MB, it exhibits negative disparity. Finally, if the quantized level of the video signal is at quantizing steps 254 or 255, then the code word which is read out of map MA in response to these quantized levels exhibits positive disparity, and if the code word is read out of map MB, it exhibits negative disparity.

Let it be assumed that, initially, memory select bit $a_8$ is a binary "0", thereby selecting map MA from which code words are read out. As long as each quantized level of the video signal is within the band from step 4 to step 253, zero disparity code words are read out of map MA. As illustrated, the flag bit $Q_{10}$ of each of these code words is a binary "0". Hence, flag bit detector 30 (FIG. 4) maintains its state whereby memory select bit $a_8$ remains as a binary "0". Now, let it be assumed that the quantized level of the next sample of the video signal lies within the lower region $H_L$ or within the upper region $H_H$. The corresponding non-zero disparity word, having positive disparity, is read out of map MA. Now, however, the flag bit $Q_{10}$ is a binary "1". Flag bit detector 30 detects this flag bit so as to change over the state of memory select bit $a_8$ to a binary "1". Thus, map MB now is selected for the next memory read-out operation. If the quantized level of the next sample of the video signal is within the band from step 4 to step 253, a corresponding zero disparity code word is read out of map MB. Since the flag bit $Q_{10}$ associated with this zero disparity word is a binary "0", flag bit detector 30 maintains its present condition such that memory select bit $a_8$ remains as a binary "1". However, if the quantized level of the next sample of the video signal lies within region $H_L$ or within region $H_H$, a corresponding negative disparity code word is read out of map MB. Since the flag bit $Q_{10}$ of this negative disparity code word is a binary "1", flag bit detector 30 changes its condition so as to return memory select bit $a_8$ to a binary "0". Hence, map MA is read out during the next memory read operation.

Thus, it is seen that, the particular map MA or MB from which a code word is read is changed over only if the immediately preceding code word was a non-zero disparity word. Furthermore, it should be appreciated that the positive disparity of those code words which correspond to the quantized steps 0–3 and 254–255 in map MA exhibit the same absolute value such as $|2|$, as the absolute value exhibited by the negative disparity code words in map MB which correspond to quantizing steps 0–3 and 254–255. Consequently, the overall DC component, known as the "digital sum value" (DSV) of successive code words is equal to zero because, if the code word does not exhibit zero disparity, when every positive disparity code word will be balanced by the next-following non-zero disparity code word of negative polarity.

In the example shown in FIG. 5, and the embodiment illustrated in FIG. 4, the zero disparity words are provided in each of maps MA and MB. If desired, all zero disparity words may be provided in a single map, or memory location, and only the non-zero disparity words may be stored in separate maps, or locations. Thus, the same zero disparity code word location is addressed regardless of the state of memory select bit $a_8$. Only the non-zero disparity code word locations, or memory maps, are changed over, or selected, as a function of the state of memory select bit $a_8$.

Preferably, the disparity of each non-zero disparity code word which is associated with, or assigned to, a respective quantizing step in regions $H_L$ and $H_H$ exhibits a disparity value of $+2$ or $-2$, depending upon whether that non-zero disparity code word is stored in map MA or map MB, respectively. If desired, each positive disparity code word may be complementary to each negative disparity code word on a bit-by-bit basis. However, this is not absolutely necessary; and the present invention will operate properly without such complementary non-zero disparity words. It is sufficient merely that the disparity of each code word associated with regions $H_L$ and $H_H$ in maps MA and MB are of equal absolute value.

It is assumed that region $H_L$ is comprised of four quantizing steps, and region $H_H$ is comprised of two quantizing steps. If desired, these regions may be comprised of any appropriate number a and b quantizing steps, respectively. Furthermore, if zero disparity words are to be used for the block synchronizing word SYNC, then the number of zero disparity code words which are available to represent the quantizing steps likewise is reduced from 250 steps to, for example, 247 steps. Hence, the number of quantizing steps which are included within regions $H_L$ and $H_H$ may be correspondingly increased.

Figure 6:
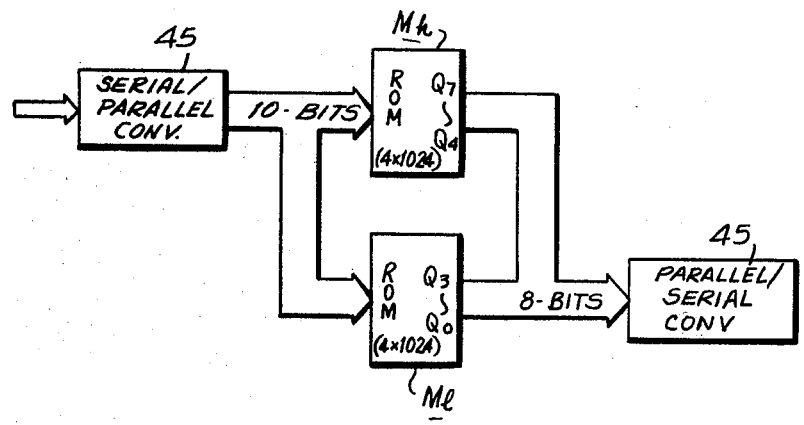
FIG. 6 is a block diagram of a decoder which can be used to recover the information encoded by the present invention.

Turning now to FIG. 6, there is illustrated one embodiment of a decoder 40 which is adapted to decode the 10-bit code words which are produced by the block encoder shown in FIG. 4. If it is assumed that decoder 40 is to be used in, for example, the reproducing section of the digital VTR shown in FIG. 1, then it is recalled that the reproduced digital signals are supplied serially-by-bit. A shift register 44 is provided to convert the serial bit stream to successive, parallel 10-bit code words. Each code word is supplied to a memory comprised of, for example, memory devices $M_l$ and $M_h$, each of which may be constructed as a read only memory (ROM).

Each ROM $M_l$ and $M_h$ may be of the so-called 4×1024 type which, for example, includes 1,024 addressable storage locations, each of which stores four separate bits. These memory devices are addressed simultaneously so as to read out the 8-bit data word in response to the received 10-bit code word, the latter functioning as an address word. In particular, the four lower order bits $Q_0$-$Q_3$ of each 8-bit data word are stored in ROM $M_l$, and the four higher order bits $Q_4$-$Q_7$ of those 8-bit data words are stored in ROM $M_h$. It is appreciated that each 10-bit code word thus is used to address corresponding locations in each of these ROMs, whereby the lower order bits $Q_0$-$Q_3$ are read out of ROM $M_l$ simultaneously with the higher order bits $Q_4$-$Q_7$ which are read out of ROM $M_h$. Bits $Q_0$-$Q_7$ are combined to form the 8-bit data word which corresponds to the received 10-bit code word.

It is appreciated that, regardless of whether the received 10-bit code word is of zero, positive or negative disparity, each such 10-bit code word is associated with a corresponding one 8-bit data word. It is this corresponding 8-bit data word that is read out of the memory devices in response to the received 10-bit code word.

Two separate 4×1024 read only memory devices are used in the embodiment shown in FIG. 6 because, as a practical matter, this type of memory device is readily available on the commercial market. If a single 8×1024 memory device is available, that device can be used in place of the illustrated ROMs $M_l$ and $M_h$. Furthermore, since only 256 10-bit code words are used to represent each data word, if desired, a suitable read only memory device having 8×256 configuration can be provided.

The 8-bit data word which is read out of the memory is supplied, in parallel-by-bit form. If desired, these parallel-bit data words may be converted to serial-bit words by a shift register 45. This shift register may be synchronized with shift register 44 and functions as a parallel-to-serial converter. The serialized data words then may be supplied to a ditigal-to-analog converter for conversion back to analog form.

When the present invention is used in the environment of a digital video recorder, adjacent samples of the input video signal exhibit relatively high correlation. Thus, there may be little change in successive 8-bit digitized samples, resulting in similarly little change in successive 10-bit code words. It is possible that, if those code words which represent analog levels having a high probability of recurrence exhibit relatively long run-lengths, that is, such code words are provided wih a large number of successive binary "1"s or binary "0"s, an error pattern will be formed from one code word to another. More specifically, the luminance level of the video signal more often is within the range of 50 to 70 IRE units. It is, therefore, advantageous to avoid the generation of the aforementioned error pattern due to high run-lengths when the quantized level of the input video signal is within this band of 50 to 70 IRE units.

This avoidance of an error pattern is achieved by assigning code words having zero disparity and having similar run-lengths to adjacent quantized steps. Furthermore, code words having the shortest run lengths are assigned to those quantized levels which fall within the band of 50 to 70 IRE units. That is, zero disparity code words having the smallest run lengths are assigned to those quantizing levels which are disposed in the band 50 to 70 IRE units, and those zero disparity code words having progressively larger run lengths are assigned to those quantizing levels which are disposed progressively farther from this band. Hence, if the center of this band corresponds to the quantized step 132, then the code word assigned to this quantized step exhibits minimal run length, while the code words assigned to progressively lower quantized steps exhibit progressively larger run length. Likewise, the code word assigned to quantized step 133 may exhibit minimal run length, and those code words which are assigned to progressively higher quantized steps exhibit relatively larger run lengths. Also, quantized steps 132 and 133 are assigned with code words exhibiting similar run lengths. Preferably, although not necessarily, the code words which are assigned to progressively lower quantized steps are complementary to those code words which are assigned to progressively higher quantized steps. Furthermore, the quantizing levels which correspond to the luminance signal level in the band 50 to 70 IRE units may be considered to be disposed substantially in the center of the quantizing range this quantizing range having quantizing steps 0 to 255.

With the aforementioned, preferable relationship between quantizing level and run-length, memory maps MA and MB may be represented by the following tables:

TABLE 1

| | | Converting Map MA | | |
|---|---|---|---|---|
| Quantiz-ing level | Flag Bit (MSB) | 10-bit Word | | Remarks |
| 0 | 1 | 1101010101 | | +2 disparity word |
| 1 | 1 | 1011010101 | | +2 disparity word |
| 2 | 1 | 1010110101 | | +2 disparity word |
| 3 | 1 | 1010101101 | | +2 disparity word |
| 4 | 0 | 1111100000 | zero | run length of "1" = 5 |
| 5 | 0 | 1111000001 | dis- | run length of "1" = 4 |
| . | | | | |
| . | | | | |
| 35 | 0 | 1000111100 | parity | run length of "1" = 4 |
| 36 | 0 | 0001010111 | words | run length of "1" = 3 |
| . | | | | |
| . | | | | |
| 90 | 0 | 1110100100 | | run length of "1" = 3 |
| 91 | 0 | 0010011011 | | run length of "1" = 2 |
| 92 | 0 | 0010101011 | | run length of "1" = 2 |
| . | | | | |
| . | | | | |
| 132 | 0 | 0101010101 | | run length of "1" = 1 |
| 133 | 0 | 1010101010 | | run length of "1" = 1 |
| 134 | 0 | 1001001011 | | run length of "0" = 2 |
| 135 | 0 | 1001001101 | | run length of "0" = 2 |
| . | | | | |

TABLE 1-continued

| Quantiz-ing level | Converting Map MA | | |
|---|---|---|---|
| | Flag Bit (MSB) | 10-bit Word | Remarks |
| . | | | |
| 175 | 0 | 0110100011 | run length of "0" = 3 |
| 176 | 0 | 0001101011 | run length of "0" = 3 |
| . | | | |
| 228 | 0 | 1101000011 | run length of "0" = 4 |
| 229 | 0 | 1100001110 | run length of "0" = 4 |
| . | | | |
| 253 | 0 | 0000011111 | run length of "0" = 5 |
| 254 | 1 | 1010101011 | +2 disparity word |
| 255 | 1 | 1100101011 | +2 disparity word |

TABLE 2

| Quantiz-ing Level | Converting Map MB | | |
|---|---|---|---|
| | Flag Bit (MSB) | 10-bit Word | Remarks |
| 0 | 1 | 0010101010 | −2 disparity word |
| 1 | 1 | 0100101010 | −2 disparity word |
| 2 | 1 | 0101001010 | −2 disparity word |
| 3 | 1 | 0101010010 | −2 disparity word |
| 4 | 0 | 1111100000 | zero run length of "1" = 5 |
| 5 | 0 | 1111000001 | dis- run length of "1" = 4 |
| . | | | |
| 35 | 0 | 1000111100 | parity run length of "1" = 4 |
| 36 | 0 | 0001010111 | words run length of "1" = 3 |
| . | | | |
| 90 | 0 | 1110100100 | run length of "1" = 3 |
| 91 | 0 | 0010011011 | run length of "1" = 2 |
| 92 | 0 | 0010101011 | run length of "1" = 2 |
| . | | | |
| 132 | 0 | 0101010101 | run length of "1" = 1 |
| 133 | 0 | 1010101010 | run length of "1" = 1 |
| 134 | 0 | 1001001011 | run length of "0" = 2 |
| 135 | 0 | 1001001101 | run length of "0" = 2 |
| . | | | |
| 175 | 0 | 0110100011 | run length of "0" = 3 |
| 176 | 0 | 0001101011 | run length of "0" = 3 |
| . | | | |
| 228 | 0 | 1101000011 | run length of "0" = 4 |
| 229 | 0 | 1100001110 | run length of "0" = 4 |
| . | | | |
| 253 | 0 | 0000011111 | run length of "0" = 5 |
| 254 | 1 | 1010101011 | −2 disparity word |
| 255 | 1 | 1100101011 | −2 disparity word |

It is seen that each 10-bit code word in map MA is equal to the same, corresponding 10-bit code word in map MB to represent the same quantizing level in the band of quantizing steps from 4 to 253. The run lengths of these code words is minimal for steps 132 and 133, which steps are substantially in the center of this band. Furthermore, the run lengths of the code words progressively increase with those quantizing levels which are disposed progressively farther from this center. Also, the band of quantizing steps from 4 to 253 is seen to lie substantially in the middle of the overall quantizing range of 0 to 255. Four quantizing steps (0 to 3) lie below the aforementioned band and, in map MA, are assigned with code words having positive disparity; and in map MB, these same quantizing steps are assigned with code words having negative disparity. Likewise, two quantizing steps are provided above this band and, in map MA, these two steps are assigned with code words having positive disparity; and in map MB, these same steps are assigned with code words having negative disparity. Also, it is seen from these tables that the flag bit associated with the zero disparity code words is a binary "0", and is a binary "1" for the non-zero disparity code words. As mentioned above, if desired, separate maps MA and MB may be provided only for the non-disparity code words; and the same, common map may be used for the zero disparity code words. This may be attained by providing a memory address circuit which, essentially, "ignores" the memory select bit $a_8$ if the 8-bit address word ($a_0$–$a_7$) derived from the quantized video signal addresses that section of the memory in which zero disparity words are stored.

Turning now to FIG. 7, there is illustrated another embodiment of a block encoder which can be used in the present invention. This embodiment is similar to that shown in FIG. 4, except that, rather than separate lower order, middle order and higher order read only memory devices, the embodiment of FIG. 7 provides a single read only memory device, ROM $M_a$, which is an 11×256 read only memory, for storing memory map MA, and ROM $M_b$, which also is an 11×256 read only memory, for storing memory map MB. Each of ROMs $M_a$ and $M_b$ functions, in response to an address supplied thereto, to read out the 11-bit contents of the addressed memory location. These eleven bits are constituted by the 10-bit code word $Q_0$–$Q_9$ and the flag bit $Q_{10}$. This flag bit $Q_{10}$, read out of either ROM $M_a$ and $M_b$, is supplied to a flag bit detector 50 which, for example, may be similar to flag bit detector 30, discussed above with respect to FIG. 4. As an example, whenever a non-zero disparity code word is read out of ROM $M_a$, the flag bit $Q_{10}$ which accompanies this code word is detected by flag bit detector 50 to produce a binary "0". This binary "0" functions as the memory select bit $a_8$, discussed above, and serves to inhibit ROM $M_a$ from reading out the contents of the next-addressed location. This binary "0" memory select bit is, however, inverted by inverter 51 to enable ROM $M_b$ to operate in response to the next address word. Similarly, when a non-zero code word is read out of ROM $M_b$, its accompanying flag bit is detected by flag bit detector 50 which produces a binary "1" memory select bit. This binary "1" is inverted by inverter 51 to inhibit ROM $M_b$ from operating in response to the next address word; and also enables ROM $M_a$ to read out the next code word in response to that next address word. Of course, and as described above, the zero disparity words which are stored in each of ROM $M_a$ and $M_b$ are provided wih a binary "0" flag bit which does not affect the state of the memory select bit produced by flag bit detector 50.

Thus, the operation of the embodiment shown in FIG. 7 serves to produce the same zero disparity code word, regardless of the particular ROM which is enabled. However, when the quantized level of the input video signal falls within regions $H_H$ or $H_L$, the corresponding non-zero disparity word which is read out of the ROMs alternates between a positive disparity code word and a negative disparity code word, in the manner discussed above. Consequently, the overall DC component of the code words is maintained at zero, even though non-zero disparity code words may be selected.

Yet another embodiment of the present invention is shown in FIG. 8. This embodiment differs from that shown in FIG. 7 in that each of ROM $M_a$ and $M_b$ is a 10×256 read only memory device. That is, at each of the 256 addressable locations in each ROM, only 10-bit code words are stored. Flag bit $Q_{10}$ is omitted. Nevertheless, each code word that is read out of either ROM $M_a$ or ROM $M_b$ is supplied, serially-by-bit via shift register 26, to a disparity sensor 60. This disparity sensor functions to sense the binary "1"s and "0"s in each code word to determine the disparity of that word. If, for example, the number of binary "1"s in a read-out code word is less than or greater than 5, then that code word must exhibit negative or positive disparity, respectively. This is because, in a 10-bit code word, zero disparity obtains when five binary "1" bits are present.

As one example thereof, disparity sensor 60 may comprise a counter which is adapted to count each binary "1" included in the code word read out of ROM $M_a$ or ROM $M_b$. A gating circuit also may be provided to sense if the count of that counter is equal to 5. If so, then the memory select bit produced thereby is maintained. However, if the count differs from a count of 5, then this memory select bit is changed over, either from a binary "0" to a binary "1" or from a binary "1" to a binary "0". For example, the output of such a gating circuit may be coupled to a J-K flip-flop circuit to toggle that flip-flop circuit whenever a count which differs from 5 is detected. As another embodiment thereof, disparity sensor 60 may include an up/down counter which is adapted to count in the upward direction in response to each binary "1" included in the read-out code word, and to count in the downward direction in response to each binary "0" therein. If, after counting all of the bits included in the code word, the count of the up/down counter is other than zero, the J-K flip-flop circuit may be "toggled" so as to change over the state of the memory select bit.

While the present invention has been particularly shown and described with reference to certain preferred embodiments, it should be readily apparent to those of ordinary skill in the art that various changes and modifications in form and details may be made without departing from the spirit and scope of the invention. For example, the present invention finds ready application in environments and systems other than video recorders. Stated broadly, any n-bit data word may be converted to an m-bit code word, wherein m>n. This invention can be used in digital data transmission systems, recording systems, and the like. Also, stated broadly, if $2^n$ quantizing levels are used, and if $2^n$ exceeds the number of m-bit words having zero disparity, then some of the quantizing levels can be represented by m-bit words having non-zero disparity. Such non-zero disparity words may be equal to a+b, wherein a is equal to the number of quantizing levels below a predetermined band within the overall range of quantizing levels, and b is equal to the number of quantizing levels above this predetermined band.

Furthermore, although each memory included within the block encoders has been described as being addressed by, for example, an n-bit digital signal derived from a quantized analog signal, the memory can be comprised of a memory device whose storage locations are read out directly in response to the quantized analog levels themselves. For instance, such a memory device may include $2^n$ separate address terminals, one of which is supplied with an address signal as a function of the sampled, quantized level of the input video signal. Such a memory device also may store memory maps MA and MB, which are selected by a memory select signal, for example, memory select bit $a_8$, and which may contain the non-zero disparity code words (with the zero disparity code words being stored in an area that is addressed irrespective of the memory select signal) or both the zero and non-zero disparity code words.

It is intended that the appended claims be interpreted as including the foregoing as well as various other such changes and modifications.

What is claimed is:

1. A method of converting an analog signal to a plural-bit digital signal having minimal DC component, comprising the steps of quantizing said analog signal over a range of quantizing levels; associating each quantizing level with a respective digital signal, the digital signals associated with a predetermined band of quantizing levels having zero disparity, and each digital signal having an intrinsic run-length of "1" and "0" bits; assigning zero disparity digital signals having the smallest run-lengths to those quantizing levels which are disposed substantially in the center of said range and having progressively larger run-lengths to those quantizing levels which are disposed progressively farther from said center of said range; and producing the digital signal associated with the quantized level of said analog signal.

2. The method of claim 1, wherein each digital signal is comprised of m bits, m being an even number, and the number of quantizing levels in said range is equal to $2^n$, m>n.

3. The method of claim 2 wherein m=n+2.

4. The method of claim 3 wherein the number of quantizing levels in said range is greater than the number of zero disparity m-bit digital signals; and further comprising the step of associating a quantizing levels below said predetermined band with a m-bit digital signals having non-zero disparity and b quantizing levels above said predetermined band with b m-bit digital signals having non-zero disparity; the sum of the digital signals associated with said predetermined band of quantizing levels plus said a and b m-bit digital signals being substantially equal to $2^n$.

5. The method of claim 4 wherein m=10 and n=8.

6. The method of claim 4 wherein said step of associating a quantizing levels below said predetermined band with a m-bit digital signals having non-zero disparity and b quantizing levels above said predetermined band with b m-bit digital signals having non-zero disparity comprises associating a first set of a and b m-bit digital signals having positive disparity with said a and b quantizing levels, respectively; associating a second set of a and b m-bit digital signals having negative disparity with said a and b quantizing levels, respectively; producing a corresponding one of said a and b digital signals alternately from said first and then from said second set when one and then aother quantized level of said analog signal is equal to one of said a and b quantizing levels, respectively.

7. The method of claim 6 wherein each said step of associating comprises storing each respective m-bit digital signal at an addressable location addressed in response to the quantized level of said analog signal; and each said step of producing comprises generating an address word in response to the quantized level of said analog signal, and reading out the m-bit word stored at the location addressed by said address word.

8. The method of claim 7 wherein the a and b digital signals of said first set are stored in a first area and the a and b digital signals of said second set are stored in a second area; and wherein each of the a and b digital signals in said first and second sets is provided with a flag signal; and wherein said step of producing a corresponding a and b digital signal alternately from said first and then from said second set comprises detecting a flag signal provided with a digital signal read out from one of said first and second areas, and enabling the other of said areas from which one of the a and b digital signals next is read out.

9. The method of claim 7 wherein the a and b digital signals of said first set are stored in a first area and the a and b digital signals of said second set are stored in a second area; and wherein said step of producing a corresponding a and b digital signal alternately from said first and then from said second set comprises sensing the disparity of each m-bit digital signal read out from said addressable locations, selecting one of said first and second areas from which one of the a and b digital signals is read when positive disparity is sensed, and selecting the other of said first and second areas from which one of the a and b digital signals is read when negative disparity is sensed; whereby when an a or b digital signal of one type of disparity is read, the next a or b digital signal to be read has opposite disparity.

10. A method of converting an analog signal to a plural-bit digital signal having minimal DC component, comprising the steps of quantizing said analog signal over a range of quantizing levels; storing respective plural-bit digital signals having zero disparity at predetermined addressable locations, each of said predetermined locations being addressed in response to a quantized level of said analog signal disposed within a predetermined band of said range of quantizing levels; storing a first set of a and b plural-bit digital signals having positive disparity at addressable locations in a first area, said a and b digital signals in said first area being selectively addressed in response to a and b quantized levels of said analog signal disposed above and below said predetermined band, respectively; storing a second set of a and b plural-bit digital signals having negative disparity at addressable locations in a second area, said a and b digital signals in said second area being selectively addressed in response to said a and b quantized levels of said analog signal; reading out the plural-bit digital signal from the location then being addressed in response to the quantized analog signal; and, if said quantized analog signal is one of said a or b quantized levels, reading out the corresponding a or b digital signal from one of said first and second areas which differs from the area from which the preceding a or b digital signal was read out.

11. The method of claim 10 wherein the step of addressing a location in response to a quantized level of said analog signal comprises converting said quantized level of said analog signal to a respective n-bit address word, each n-bit address word being associated with a respective location; and reading out the plural-bit digital signal stored at the location associated with the n-bit address word.

12. The method of claim 11 wherein the step of reading out an a or b digital signal from one of said first and second areas which differs from the area from which the preceding a or b digital signal was read out comprises storing a flag signal at each location in which an a or b digital signal is stored; reading out said flag signal when said a or b digital signal is read out; and changing over the particular area which will be addressed next for reading out an a or b digital signal in response to the reading out of a flag signal.

13. The method of claim 12 wherein the flag signal represents the particular area to be addressed next; and said step of changing over comprises detecting the read out flag signal, and selecting the next area to be addressed for reading out an a or b signal as a function of the detected flag signal.

14. The method of claim 11 wherein the step of reading out an a or b digital signal from one of said first and second areas which differs from the area from which the preceding a or b digital signal was read out comprises detecting the disparity of each read out digital signal; selecting said second area to be addressed next for reading out an a or b digital signal in response to a detected positive disparity; and selecting said first area to be addressed next for reading out an a or b digital signal in response to a detected negative disparity.

15. The method of claim 10 wherein each of said plural-bit digital signals having zero disparity is stored in said first area and also in said second area; and wherein the step of reading out an a or b digital signal from one of said first and second areas which differs from the area from which the preceding a or b digital signal was read out comprises selecting said second area from which the next digital signal of any disparity is read out whenever an a or b digital signal is read out from said first area, and selecting said first area from which the next digital signal of any disparity is read out whenever an a or b digital signal is read out from said second area.

16. Apparatus for converting an analog signal to an m-bit digital signal having minimal DC component, comprising quantizing means for quantizing said analog signal over a range of l quantizing levels; storage means having plural addressable storage locations, a respective storage location being addressed in response to the particular quantized level of said analog signal, for storing l m-bit digital signals representing said l quantizing levels, respectively; each m-bit digital signal having an intrinsic run-length of "1" and "0", and those m-bit digital signals having zero disparity representing a predetermined band of said l quantizing levels, with said zero-disparity signals having the smallest run-lengths stored at those locations which are addressed in response to those quantized levels disposed substantially in the center of said range of l quantizing levels and those zero-disparity signals having progressively larger run-lengths stored at those locations which are addressed in response to those quantized levels disposed progressively farther from said center; and address means for addressing a storage location of said storage means as a function of the quantized analog signal to read out the m-bit digital signal stored at said addressed location.

17. The apparatus of claim 16 wherein l is greater than the number of zero-disparity m-bit digital signals; and wherein a non-zero disparity digital signals are stored at those locations which are addressed in response to a quantized levels disposed below said predetermined band, and b non-zero disparity digital signals are stored at those locations which are addressed in response to b quantized levels disposed above said predetermined band.

18. The apparatus of claim 17, wherein $l=2^n$; and wherein $m=10$ and $n=8$.

19. The apparatus of claim 17 wherein said storage means includes a first storage area for storing at least a and b digital signals having positive disparity at those locations which are addressed in response to said a and b quantized levels, respectively; a second storage area for storing at least a and b digital signals having negative disparity at those locations which are addressed in response to said a and b quantized levels, respectively; and selection means responsive to the reading out of one of said a and b digital signals from one of said storage areas to select the other storage area to be addressed for the next reading out of an a or b digital signal.

20. The apparatus of claim 19 wherein those locations in said first and second storage areas at which said a and b digital signals are stored each is provided with a flag signal; and wherein said selection means comprises flag signal detecting means for detecting said flag signal read out from said storage means; enabling means for enabling one or the other of said storage areas to be addressed in response to one of said a and b quantized levels; and change-over means responsive to the detection of said flag signal to change over said enabling means from one to the other of said storage areas.

21. The apparatus of claim 20 wherein said flag signal is indicative of the particular storage area from which said a or b digital signal was read; and wherein said change-over means is responsive to the detection of a flag signal indicative of said first storage area to change over said enabling means to enable said second storage area to be addressed next and is responsive to the detection of a flag signal indicative of said second storage area to change over said enabling means to enable said first storage area to be addressed next.

22. The apparatus of claim 19 wherein said selection means comprises disparity sensing means for sensing the disparity of the respective digital signals read out from said storage means; and enabling means for enabling said second storage area to be addressed next in response to said a and b quantized levels if positive disparity is detected and for enabling said first storage area to be addressed next in response to said a and b quantized levels if negative disparity is detected.

23. The apparatus of claim 19 wherein said first and second storage areas both store the same zero-disparity m-bit digital signals; and wherein said selection means selects one of said storage areas to be addressed in response to a quantized analog signal until one of said a and b digital signals is read out from said selected storage area, whereupon the other storage area is selected to be addressed.

24. Apparatus for converting an analog signal to an m-bit digital signal having minimal DC component, comprising quantizing means for quantizing said analog signal over a range of quantizing levels; storage means having plural addressable storage locations for storing the m-bit digital signals representing the respective quantizing levels; address means responsive to the particular quantized level of said analog signal for addressing a corresponding storage location of said storage means to read out the m-bit digital signal stored thereat, the m-bit digital signals stored at predetermined locations having zero disparity and representing a predetermined band of quantizing levels disposed within said range, said storage means having a first storage area in which are stored at least a first set of a and b m-bit digital signals having positive disparity and representing a and b quantizing levels disposed above and below said predetermined band, respectively, and said storage means having a second storage area in which are stored at least a second set of a and b m-bit digital signals having negative disparity and representing said a and b quantizing levels; and selection means for selecting one of said storage areas to be addressed in response to one of said a and b quantizing levels which differs from the storage area which had been addressed in response to the preceding one of said a and b quantizing levels.

25. The apparatus of claim 24 wherein those locations in said first and second storage areas in which are stored said a and b m-bit digital signals also are provided with flag signals; and wherein said selection means comprises flag signal detecting means for detecting a flag signal read out from said storage means; enabling means for enabling one or the other of said storage areas to be addressed in response to one of said a and b quantizing levels; and change-over means responsive to the detection of a flag signal to change over said enabling means from one to the other of said storage areas.

26. The apparatus of claim 25 wherein said change-over means comprises toggle means for producing a selection signal whose state determines the particular storage area to be enabled, the state of said selection signal being changed in response to each detected flag signal.

27. The apparatus of claim 25 wherein said flag signal is indicative of the particular storage area in which said a and b m-bit digital signals are stored; and wherein said change-over means is responsive to the detection of a flag signal indicative of said first storage area to change over said enabling means to enable said second storage area to be addressed next in response to one of said a and b quantizing levels and is responsive to the detection of a flag signal indicative of said second storage area to change over said enabling means to enable said first storage area to be addressed next in response to one of said a and b quantizing levels.

28. The apparatus of claim 24 wherein said selection means comprises disparity sensing means for sensing the disparity of respective digital signals read out from said storage means; and enabling means for enabling said second storage area to be addressed next in response to one of said a and b quantizing levels if positive disparity is detected and for enabling said first storage area to be addressed next in response to one of said a and b quantizing levels if negative disparity is detected.

29. The apparatus of claim 24 wherein said first and second storage areas both store the same zero disparity m-bit digital signals; and wherein said selection means selects one of said storage areas to be addressed until one of said a and b digital signals is read out from said selected storage area, whereupon the other storage area is selected to be addressed.

* * * * *